UNITED STATES PATENT OFFICE.

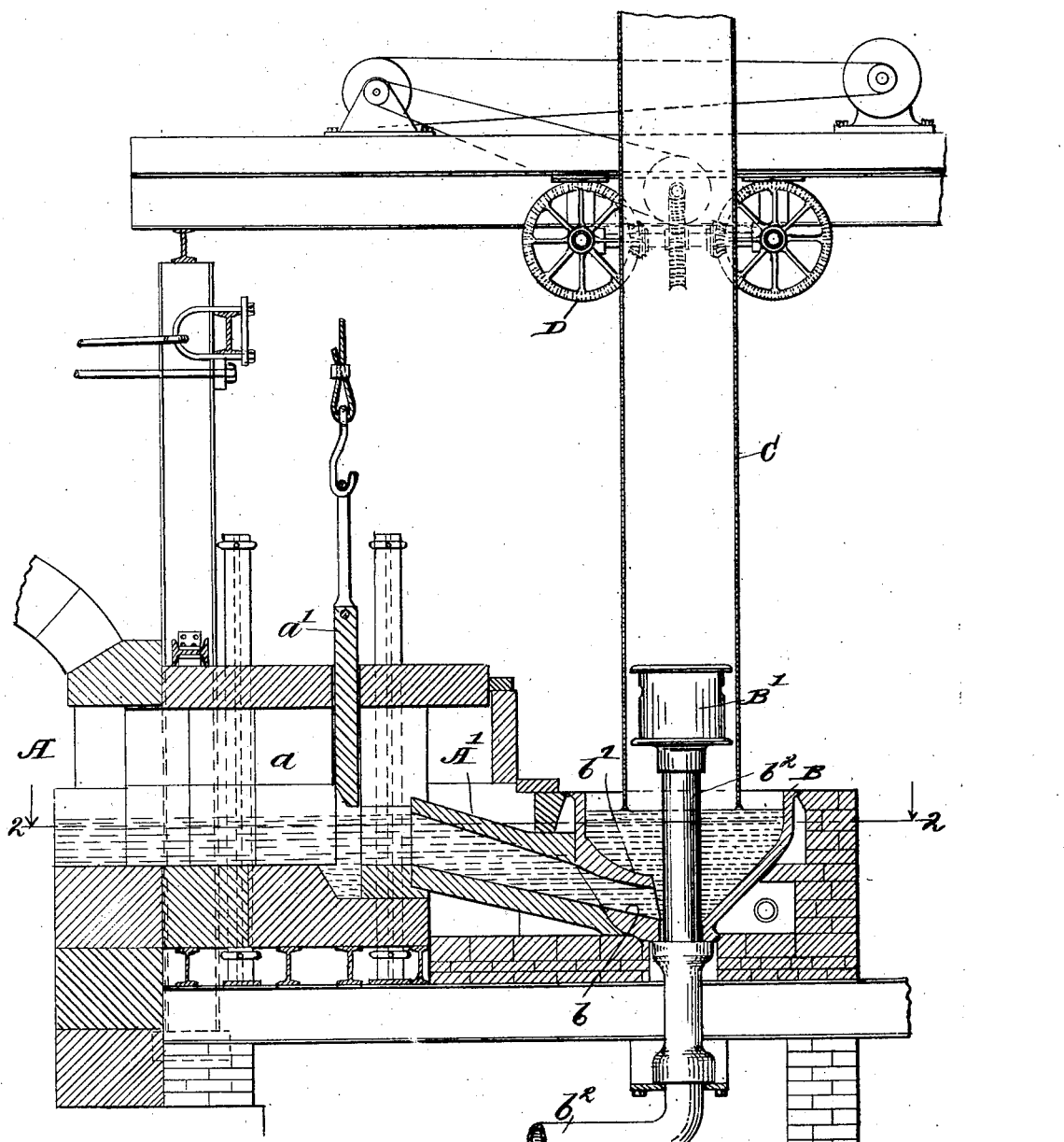

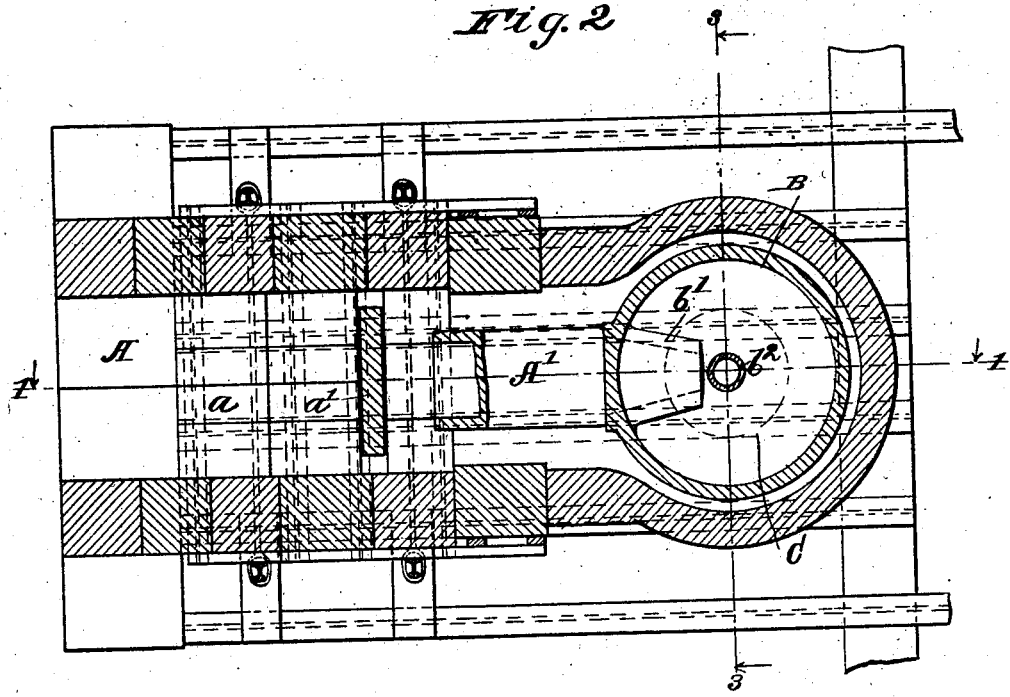
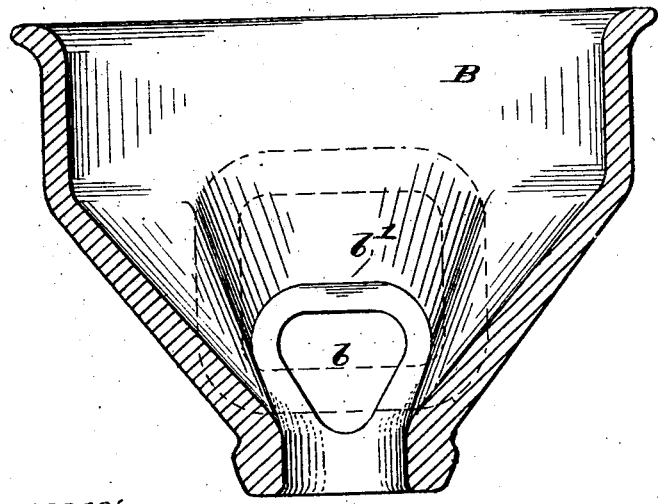

ROBERT L. FRINK, OF CLEVELAND, OHIO.

METHOD OF DRAWING GLASS.

1,119,006.  Specification of Letters Patent.  Patented Dec. 1, 1914.

Application filed June 22, 1908. Serial No. 439,767.

*To all whom it may concern:*

Be it known that I, ROBERT L. FRINK, citizen of the United States, resident of Cleveland, county of Cuyahoga, and State of Ohio, have invented a new and useful Improvement in Methods of Drawing Glass, of which the following is a specification, the principle of the invention being herein explained and the best mode in which I have contemplated applying that principle, so as to distinguish it from other inventions.

The present invention, pertaining to the art of drawing glass and particularly to that of drawing glass cylinders, or rollers, has as its object the provision of a method and apparatus suitable for use therein whereby such drawing may be considerably facilitated and the satisfactory character of the product better assured than in prevailing types of apparatus.

The general mode of drawing exemplified in the present improvement is the same as that of United States Patent, No. 846,102, issued to me March 5, 1907, and consists broadly in providing a drawing pot or vessel with a continuous supply of glass, drawing therefrom a continuous cylinder or other hollow article and severing the same into lengths as it is drawn. In the case of such patented method and apparatus the drawing is accomplished by progressively changing the point of application of the drawing strain to the cylinder, air being supplied to the interior of the cylinder at its lower end and below the point where the glass sets, and the action of such air upon the article being utilized to control its escape. However, as will appear, this particular drawing mechanism is to be considered as merely illustrative, since it is rather with the supplying of the molten glass to such mechanism, whatever the character of the latter, that we here have concern.

The object of the invention, then, is the provision of means for controlling the supply of molten glass to the drawing pot where such supply is had direct from the furnace or equivalent source in more or less continuous fashion.

To the accomplishment of this and related objects said invention consists of the means hereinafter fully described and particularly pointed out in the claim.

The annexed drawings and the following description set forth in detail certain steps embodying the invention, such disclosed steps constituting, however, but one of various ways in which the principle of the invention may be used.

In said annexed drawings: Figure 1 is a vertical section through one approved arrangement of apparatus adapted to the carrying out of my improved method of drawing glass the section being taken on the line 1—1 of Fig. 2; Fig. 2 is a transverse section of such apparatus taken on the line 2—2, Fig. 1, and Fig. 3 is a vertical section, taken on the line 3—3 of Fig. 2.

In such drawings, there is shown a glass melting furnace A of any suitable character provided with an extension or dog-house $a$, with which the drawing pot B is designed to be connected. Communication is had between the extension $a$ and such pot through a passage or conduit A' as shown, a gate $a'$ being interposed between such passage and the extension by operation of which the flow of molten glass into the drawing pot or vessel B may be stopped when desired. The drawing mechanism proper comprises a set of rolls D, between which the cylinder C is pressed and drawn upwardly, once it has been started, and an air regulating head B' that extends upwardly through an opening in the bottom of the pot for a short distance above the contemplated level of molten glass therein. The operation of such drawing mechanism need not be further noted in this connection than to state that the air, which is supplied to the head through a pipe $b^2$, is discharged into the lower portion of the cylinder being drawn, from whence it escapes around such head by distending the cylinder walls a greater or less degree as is fully described in the aforesaid Letters Patent, No. 846,102. In such patent of reference, as also in connection with apparatus for drawing glass theretofore used, it has been contemplated that the glass in the drawing pot or receptacle should be maintained at the proper drawing temperature by means of auxiliary burners and in certain methods it has furthermore been attempted to thus artificially control the temperature of the glass in the pot by the use of cooling means as well, the latter being located contiguously to the point from which the cylinder rises from the molten bath. As explained at some length in a co-pending application filed September 25, 1907, Serial No. 394,459, I am convinced as a result of numerous experiments that such attempted regulation may well be dispensed with in both instances, since in practice the harmful effects accruing therefrom far outweigh any alleged theoretical advantages. In other words no heating means have been found susceptible of such exact and nice control as not to exercise a greater heating effect on the cylinder at one point than at another; while similarly the cooling effect of a water coil encircling the cylinder will obviously vary at different points in its circuit, producing cords and other inequalities in the cylinder. I accordingly should propose to eliminate for the most part such external heating and cooling means, thus leaving as the only element to be dealt with, that of conduction.

Laying aside the proper insulation of the drawing pot to prevent unequal radiation of heat therefrom, the problem of securing uniform surface tension at all points in the circle, from which the rising cylinder springs, resolves itself into so regulating and directing the supply of fresh molten glass to said drawing pot as to subject such metal to uniform temperature changes from the point at which it is admitted to the pot until it reaches the circle aforesaid. By the present apparatus I propose to accomplish this by providing the lateral inlet or opening $b$ in the drawing receptacle with an over-arching projection $b'$ so disposed as to conduct the metal flowing in from the conduit to substantially the lower central portion of the pot, the location of the point of discharge being such that, in rising to different points in the circle defining the cylinder's base, the metal will have cooled a substantially uniform amount. To this end I esteem it desirable that the point of discharge in question should not only lie within the prolongation of the cylinder walls, but should be at a depth from the surface greater than the radial distance to such wall, i. e. greater than the radius of the cylinder.

By means of the foregoing improvements in the construction of the drawing pot, the drawing of glass cylinders of indefinite length is rendered wholly feasible, the molten glass in such pot being maintained in a state more uniformly consistent than is possible even where the method of ladling is employed and only a limited quantity of metal presented to the drawing mechanism. The over-arching of the inlet opening in the pot corrects the natural tendency of the hotter inflowing metal to rise directly to the surface, thus causing the temperature on the one side of the head $B'$ to be too high for drawing while on the other side the glass is congealing. By my method on the contrary, the fresh metal is caused to diffuse generally throughout the mixture in the pot and the temperature of the upper stratum, from which the drawing takes place, is left undisturbed.

Other modes of applying the principle of my invention may be employed instead of the one explained, change being made as regards the steps herein disclosed, provided the steps stated by the following claim or the equivalent of such stated steps be employed.

I therefore particularly point out and distinctly claim as my invention:—

The method of producing hollow glass articles, which consists in drawing a continuous cylinder from a bath of molten glass, and simultaneously replenishing such bath by supplying fresh molten glass thereto at a point directly below and wholly within the radius of said cylinder, at a depth from the surface of the bath at least equal to the radius of the cylinder and substantially central with respect to the cylindrical wall.

Signed by me this 16th day of June, 1908.

ROBERT L. FRINK.

Attested by—
E. R. RODD,
JNO. F. OBERLIN.

Copies of this patent may be obtained for five cents each, by addressing the "Commissioner of Patents, Washington, D. C."